United States Patent Office 3,410,905
Patented Nov. 12, 1968

3,410,905
METHOD OF PREPARING SECONDARY NITRAMINES
Marvin H. Gold, Sacramento, and Milton B. Frankel, Menlo Park, Calif., assignors to Aerojet-General Corporation, Azusa, Calif., a corporation of Ohio
No Drawing. Original application June 26, 1964, Ser. No. 378,456. Divided and this application Feb. 6, 1967, Ser. No. 630,481
6 Claims. (Cl. 260—583)

ABSTRACT OF THE DISCLOSURE

This patent describes a novel method of preparing secondary nitramines of the formula

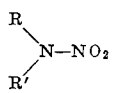

which comprises reacting a dialkyl carbamyl halide of the formula

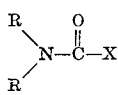

with nitric acid at a temperature from about $-30°$ C. to about $+20°$ C. wherein in the above formulae, R and R' are lower alkyl and X is halogen.

---

This application is a divisional application of Ser. No. 378,456, filed June 26, 1964, now abandoned.

This invention relates to a new and improved method for the preparation of secondary nitramines.

It is an object of the present invention to provide a novel process of converting secondary amines to secondary nitramines.

This and other objects of the present invention will become apparent from the more detailed description which follows.

We have discovered a new method for the preparation of aliphatic secondary nitramines by treating a dialkyl carbamyl halide with nitric acid as shown in the following equation:

(I) 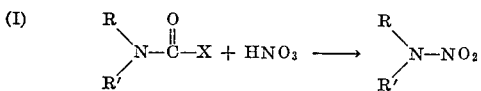

wherein in the above equation, R and R' are lower alkyl radicals of from about 1 to 6 carbons, such as methyl, ethyl, propyl, sec-butyl, neopentyl and hexyl; and X is halogen, preferably chloride, bromide or fluorine.

The process of Reaction I makes possible the preparation of secondary nitramines from starting materials, all of which are readily available on the commercial market. Our process of producing nitramines may be carried out in batch or by continuous operation. In either case, the process provides advantages which will come to be appreciated by those skilled in this art. Previously, the preparation of the nitramines commonly involved treating a secondary amine with nitric acid, acetic anhydride and a halide catalyst such as hydrochloric acid, either simultaneously or sequentially. Inherent in this synthesis route is the evolution of substantial quantities of heat due to the exothermic nature of the reaction. The heat evolution makes it difficult to control the reaction and to minimize the production of less desirable by-products.

In contrast thereto, by the present process the desired nitramines are produced in a manner which is less exothermic and hence, readily controlled.

Reaction I is normally carried out at atmospheric pressure and, preferably, at a temperature of from about $-30°$ C. to about $+20°$ C. It should be understood that carrying out the reaction under vacuum or elevated pressure is also contemplated. The use of an inert reaction solvent, such as trifluoroacetic anhydride, trifluoroacetic acid, or acetic anhydride is desirable. Alternatively, an excess of one of the reactants may serve as a solvent.

In the preferred process, nitric acid and trifluoroacetic anhydride are preferably, although not necessarily, used in about equimolar amounts or a slight excess of nitric acid. The nitric acid employed in this mixture is usually of the concentrated type, i.e., from 90 percent to about 99 percent by weight of $HNO_3$. This nitrating mixture may be used in a wide range of proportions with respect to the dialkyl carbamyl halide. Generally an excess of the nitrating mixture is employed to obtain the highest yields.

The products of Reaction I are ordinarily recovered by extraction, drying and/or evaporation.

The following examples illustrate the process of Reaction I.

Example I.—Preparation of dimethyl nitramine

To 91.7 ml. (0.663 mole) of trifluoroacetic anhydride was added 30.8 ml. (0.733 mole) of 99 percent nitric acid, cooling being required to maintain the temperature at $-5°$ to $0°$. The solution was cooled to $-30°$ and 14.7 grams (0.137 mole) of dimethylcarbamyl chloride was added dropwise. The mixture was allowed to warm to $10°$ and the resulting solution was distilled at 2 mm. to approximately half the volume and poured on 150 grams of ice. The solution was basified with sodium hydroxide to a pH of 11 and treated with ether in a liquid extraction for 16 hours. After drying and evaporating the ether phase, there was obtained 5.3 grams (43.1 percent) of faint yellow crystals, M.P. $49°$ to $53°$. The product was sublimed at $40°/2$ mm. There was no depression in melting point when mixed with an authentic sample of dimethyl nitramine.

Example II.—Preparation of diethyl nitramine

To 91.7 ml. (0.663 mole) of trifluoroacetic anhydride was added 30.8 ml. (0.733 mole) of 99 percent nitric acid, cooling being required to maintain the temperature at $-5°$ to $0°$. The solution was cooled to $-30°$ and 0.13 mole of diethylcarbamyl chloride was added dropwise. The mixture was allowed to warm to $10°$ and the resulting solution was distilled at 2 mm. to approximately half the volume and poured on 150 grams of ice. The solution was basified with sodium hydroxide to a pH of 11 and treated with ether in a liquid extraction for 16 hours. After drying and evaporating the ether phase, there was obtained a 40.2% yield of crystalline produce, $n_D^{25}$ 1.4528. The product was sublimed at $45°/0.6$ mm. There was no depression in melting point when mixed with an authentic sample of diethyl nitramine.

Example III.—Preparation of diisopropyl nitramine

To 0.6 mole of trifluoroacetic anhydride is added 0.7 mole of 99 percent nitric acid, cooling being required to maintain the temperature at $-5°$ to $0°$ C. The solution is cooled to $-30°$ C., and 0.14 mole of diisopropylcarbamyl chloride is added dropwise. The mixture was allowed to warm to $10°$ C. and the resulting solution is distilled to approximately half the volume and poured on 150 grams of ice. The solution is basified with sodium hydroxide to a pH of 11 and treated with ether in a liquid extraction for about 16 hours. After drying and evaporating the ether phase, there is obtained a good yield of crystalline product. There is no depression in melting point when mixed with an authentic sample of diisopropyl nitramine.

Example IV.—Preparation of dihexyl nitramine

To 0.6 mole of trifluoroacetic anhydride is added 0.7 mole of 99 percent nitric acid, cooling being required to maintain the temperature at −5° to 0° C. The solution is cooled to −30° C., and 0.15 mole of dihexylcarbamyl chloride is added dropwise. The mixture is allowed to warm to 10° C., and the resulting solution is distilled to approximately half the volume and poured on 150 grams of ice. The solution is basified with sodium hydroxide to a pH of 11 and treated with ether in a liquid extraction for about 16 hours. After drying and evaporating the ether phase, there is obtained a good yield of product. There is no depression in melting point when mixed with an authentic sample of dihexyl nitramine.

By the process just described, other secondary amines can be converted to nitramines. Thus, dibutylcarbamyl chloride can be converted to dibutyl nitramine, dipentylcarbamyl bromide to dipentyl nitramine, ditertiarybutylcarbamyl bromide to ditertiarybutyl nitramine, and diheptylcarbamyl chloride to diheptyl nitramine.

The nitramine compounds produced by this process are useful as high explosives and can be used in any conventional explosive missile or projectile as the main explosive charge. An example of such a missile is disclosed in United States Patent No. 2,470,162, issued May 17, 1949. One way of using the high explosives of this invention in a device such as that disclosed in United States Patent No. 2,470,162, is to pack the crystalline explosive in powder form into the warhead of the missile. A charge thus prepared is sufficiently insensitive to withstand the shock entailed in the ejection of a shell from a gun barrel under the pressure developed from ignition of a propellant charge, and can be caused to explode on operation of an impact or time fuse mechanism firing a detonating explosive.

Having fully described the invention, it is intended that it be limited only by the lawful scope of the appended claims.

We claim:

1. The method of preparing secondary nitramines of the formula:

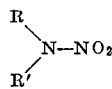

which comprises reacting a dialkyl carbamyl halide of the formula:

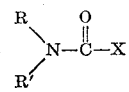

with nitric acid at a temperature of from about −30° C. to about +20° C., wherein in the above formulae, R and R' are lower alkyl and X is halogen.

2. The method of preparing secondary nitramines of the formula:

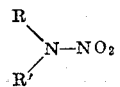

which comprises reacting a dialkyl carbamyl halide of the formula:

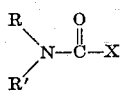

with nitric acid in trifluoracetic anhydride at a temperature of from about −30° C. to about +20° C., wherein in the above formulae, R and R' are lower alkyl and X is halogen.

3. The method of preparing dimethyl nitramine which comprises reacting dimethylcarbamyl chloride with nitric acid in trifluoracetic anhydride at a temperature of from about −30° C. to about +20° C.

4. The method of preparing diethyl nitramine which comprises reacting diethylcarbamyl chloride with nitric acid in trifluoracetic anhydride at a temperature of from about −30° C. to about +20° C.

5. The method of preparing diisopropyl nitramine which comprises reacting diisopropylcarbamyl chloride with nitric acid in trifluoracetic anhydride at a temperature of from about −30° C. to about +20° C.

6. The method of preparing dihexylpropyl nitramine which comprises reacting dihexylcarbamyl chloride with nitric acid in trifluoracetic anhydride at a temperature of from about −30° C. to about +20° C.

References Cited

UNITED STATES PATENTS 2,856,429   10/1958   Sauer _____ 260—583

CHARLES B. PARKER, *Primary Examiner.*

R. L. RAYMOND, *Assistant Examiner.*